United States Patent [19]

Saki et al.

[11] Patent Number: 5,214,906
[45] Date of Patent: Jun. 1, 1993

[54] RIDING-TYPE LAWN MOWER WITH REAR DISCHARGE SLOT

[75] Inventors: Mitsuo Saki; Shoichi Rinzaki; Satoshi Watanabe; Kenji Higashi; Hiroshi Kobayashi, all of Saitama; Tomomi Nakaya, Chiba, all of Japan

[73] Assignee: Honda Giken Kogyo Kabushiki Kaisha, Tokyo, Japan

[21] Appl. No.: 782,158

[22] Filed: Oct. 24, 1991

[30] Foreign Application Priority Data

Oct. 24, 1990 [JP] Japan .................. 2-286477
Oct. 24, 1990 [JP] Japan .................. 2-286478

[51] Int. Cl.$^5$ .................. A01D 34/66; A01D 34/70
[52] U.S. Cl. .................. 56/320.2; 56/13.6; 56/DIG. 22
[58] Field of Search .................. 56/6, 13.6, 14.7, 320.1, 56/320.2, 202, DIG. 22

[56] References Cited

U.S. PATENT DOCUMENTS

| | | | |
|---|---|---|---|
| 3,157,014 | 12/1964 | Bottenberg | 56/6 |
| 3,969,876 | 7/1976 | Turos | 56/202 |
| 4,099,366 | 7/1978 | Peterson | 56/DIG. 22 X |
| 4,335,567 | 6/1982 | Comer | 56/12.7 |
| 4,364,221 | 12/1982 | Wixom | 56/320.2 X |
| 4,856,265 | 8/1989 | Wolf | 56/320.2 |
| 4,903,467 | 2/1990 | Wolf | 56/16.6 |
| 4,996,829 | 3/1991 | Saitoh et al. | 56/13.3 |

FOREIGN PATENT DOCUMENTS 58-129907 8/1983 Japan .
427120 4/1935 United Kingdom .................. 56/13.6

Primary Examiner—David J. Bagnell
Attorney, Agent, or Firm—Irving M. Weiner; Joseph P. Carrier; Pamela S. Burt

[57] ABSTRACT

A riding-type lawn mower has a cutter housing with a rear discharge slot defined in a rear wall thereof. The cutter housing accommodates a pair of cutter blades laterally spaced from each other and rotatable in a substantially horizontal plane. The cutter blades are arranged such that the cutter blade on the righthand side as viewed in a forward direction of the lawn mower body is rotatable clockwise as viewed in plan and the cutter blade on the lefthand side as viewed in the forward direction of the lawn mower body is rotatable counterclockwise as viewed in plan. The cutter housing has an upper wall that has a pair of laterally spaced portions raised upwardly and defining respective discharge passages in the cutter housing that lead to the rear discharge slot. Rotative power from a lawn mower engine is transmitted to the cutter blades by a belt-and-pulley mechanism disposed on a low flat portion defined between the raised portions of upper wall. The cutter housing has a scroll-shaped discharge guide for guiding grass clippings smoothly into the rear discharge slot.

14 Claims, 5 Drawing Sheets

RIDING-TYPE LAWN MOWER WITH REAR DISCHARGE SLOT

BACKGROUND OF THE INVENTION

1. Field of the Invention

The present invention relates to a riding-type lawn mower with a rear discharge slot, and more particularly to a riding-type lawn mower having two horizontally rotatable cutter blades that are juxtaposed laterally with respect to each other and housed in a cutter housing which has a discharge slot defined in a rear wall thereof and is disposed substantially centrally below the body of the lawn mower.

2. Description of the Prior Art

Some known walking-type lawn mowers have two horizontally rotatable cutter blades that are juxtaposed laterally with respect to each other and housed in a cutter housing which has at least one rearwardly opening discharge slot. The cutter blade which is positioned on the right-hand side as viewed in the forward direction of the lawn mower is rotatable counterclockwise when viewed in plan. Such lawn mowers are disclosed in U.S. Pat. No. 3,157,014 and Japanese Laid-Open Patent Publication No. 58-129907.

The cutter housing shown in U.S. Pat. No. 3,157,014 has two laterally spaced independent discharge slots defined in the rear wall thereof. In the lawn mower disclosed in Japanese Laid-Open Patent Publication No. 58-129907, the cutter housing has a common discharge slot defined in a rear wall thereof and divided into two laterally spaced openings by a partition, and also has an upper wall whose laterally spaced outer portions are progressively higher toward the discharge slot, with motors mounted on the upper wall and connected to the respective cutter blade assemblies.

FIG. 5 of the accompanying drawings shows the manner in which grass is clipped by such a conventional lawn mower. It is assumed that the grass is cut by two laterally spaced cutter blades b housed in a cutter housing h as the lawn mower moves in a forward direction indicated by the arrow F. When the lawn mower moves, two strips of grass are trampled on forwardly by two front wheels f of the lawn mower, as shown in FIG. 6, and thereafter the grass is cut by cutting edges c of the cutter blades b.

As shown in FIG. 7, if the cutting edges c of each cutter blade b traveled in a direction r, which would be the same as the forward direction F, in the trampled-on grass strip, then the trampled-on grass would be further pressed downwardly by the cutting edges c and air streams developed thereby. If the cutter blades b are rotated to move the cutting edges c in a direction R, which is opposite to the forward direction F, in the trampled-on grass strip, then the trampled-on grass can be raised by the cutting edges c and air streams developed thereby. Since the raised grass can effectively be cut off by the cutting edges c, the grass can be clipped well.

Therefore, it is preferable, as shown in FIG. 5, that the cutter blade b positioned on the righthand side as viewed in the forward direction F be rotated clockwise as viewed in plan, and the cutter blade b positioned on the lefthand side as viewed in the forward direction F be rotated counterclockwise as viewed in plan.

With the cutter blades rotating in the above directions, the cutter housing should have separate grass clipping passages connected to the cutter blades b, the grass clipping passages being defined by the laterally spaced portions of the upper wall of the cutter housing that are progressively higher toward the rear discharge slots.

In riding-type lawn mowers, unlike the disclosed walking-type lawn mowers, it is necessary that the rotative power from the engine mounted on the body of the lawn mower be transmitted to two rotatable shafts coupled to the cutter blades and projecting upwardly from the cutter housing. Since the cutter housing is vertically movable for adjusting the height of trimmed grass, the engine is usually coupled to the rotatable shafts of the cutter blades through a belt-and-pulley mechanism.

Because the belt-and-pulley mechanism is disposed on the progressively higher portions of the upper wall of the cutter housing, the overall height and hence the overall size of such a riding-type lawn mower are larger than those of conventional riding-type lawn mowers.

SUMMARY OF THE INVENTION

It is an object of the present invention to provide a riding-type lawn mower having a rear discharge slot, which can reliably clip the grass that has been trampled on by front wheels with two cutter blades and can efficiently discharge grass clippings rearwardly, and which has a belt-and-pulley mechanism disposed in a space above a cutter housing, making it possible to reduce the overall size of the lawn mower.

According to the present invention, there is provided a riding-type lawn mower comprising a body, an engine mounted on the body, front and rear wheels rotatably supported on the body, a cutter housing disposed substantially centrally below the body, the cutter housing having an upper wall facing the body and a rear wall extending from the upper wall, the rear wall having a rear discharge slot defined therein, a pair of cutter blades laterally spaced from each other and rotatably housed in the cutter housing for rotation in a substantially horizontal plane, a pair of rotatable shafts extending through and rotatably supported by the upper wall, the cutter blades being mounted on lower ends of the rotatable shafts, respectively, the cutter blades being arranged such that the cutter blade on the righthand side as viewed in a forward direction of the body is rotatable clockwise as viewed in plan and the cutter blade on the lefthand side as viewed in the forward direction of the body is rotatable counterclockwise as viewed in plan, the upper wall having a pair of laterally spaced portions raised upwardly and defining respective discharge passages in the cutter housing, and a belt-and-pulley mechanism disposed between the raised portions of the upper wall, for transmitting rotative power from the engine to the rotatable shafts.

According to the present invention, there is also provided a riding-type lawn mower comprising a body, a cutter housing disposed below the body, the cutter housing having an upper wall facing the body and a rear wall extending from the upper wall, the rear wall having a rear discharge slot defined therein, a pair of cutter blades laterally spaced from each other and rotatably housed in the cutter housing for rotation in a substantially horizontal plane, a pair of rotatable shafts extending through and rotatably supported by the upper wall, the cutter blades being mounted on lower ends of the rotatable shafts, respectively, the cutter blades being arranged such that the cutter blade on the righthand side as viewed in a forward direction of the body is rotatable clockwise as viewed in plan and the cutter blade on the lefthand side as viewed in the forward direction of the body is rotatable counterclockwise as viewed in plan, and a scroll-shaped discharge guide extending from the upper wall, the scroll-shaped discharge guide comprising a pair of laterally spaced substantially cylindrical portions disposed around the rotatable shafts, respectively, a pair of partitions joined to each other and disposed substantially centrally in the rear discharge slot, and a pair of laterally spaced substantially straight portions extending between and joined to outer surfaces of the cylindrical portions and the partitions.

The cutter housing has a center line substantially aligned with a longitudinal axis of the body, the cutter blades being positionally displaced from each other along the center line and rotatable along respective paths that overlap the center line, the straight portions having different lengths and having imaginary extensions intersecting at a point on the center line, the partitions being positioned behind the point and the partitions having respective front curved portions blending into rear sections, respectively, of the straight portions.

Since the cutter blade on the righthand side as viewed in a forward direction of the body is rotatable clockwise as viewed in plan and the cutter blade on the lefthand side as viewed in the forward direction of the body is rotatable counterclockwise as viewed in plan, the grass that has been trampled on forwardly by the front wheels can reliably be clipped by the cutter blades. The raised portions of the upper wall of the cutter housing provide the discharge passages for efficiently discharging grass clippings into the rear discharge slot.

The belt-and-pulley mechanism for transmitting the engine power to the rotatable shafts connected to the cutter blades is disposed in a space created between the laterally spaced raised portions of the upper wall. Therefore, the overall height of the lawn mower may be reduced, and nence the lawn mower may be relatively small in size.

The scroll-shaped discharge guide, which extends from the upper wall, has the laterally spaced substantially cylindrical portions disposed around the rotatable shafts, respectively, the partitions joined to each other and disposed substantially centrally in the rear discharge slot, and the laterally spaced substantially straight portions extending between and joined to outer surfaces of the cylindrical portions and the partitions. The scroll-shaped discharge guide allows grass clippings to be discharged from around the rotatable shafts into the rear discharge slot along the directions in which the cutter blades rotate.

Inasmuch as the cutter blades are positionally displaced from each other along the center line of the cutter housing and rotatable along respective paths that overlap the center line, no grass will be left uncut between the cutter blades.

The straight portions of the discharge guide have different lengths that make a flow of grass clippings along the shorter straight portion stronger than a flow of grass clippings along the longer straight portion. However, the partitions in the rear discharge slot are effective to prevent any adverse effect that the flow of grass clippings along the shorter straight portion would otherwise have on the flow of grass clippings along the longer straight portion.

The partitions are positioned behind the point of intersection between the imaginary extensions of the straight portions. The partitions have the respective front curved portions blending into rear sections, respectively, of the straight portions. The curved portions permit the grass clippings traveling along the straight portions to flow smoothly into the rear discharge slot.

The above and further objects, advantages and details of the present invention will be come apparent from the following detailed description of a preferred embodiment thereof, when read in conjunction with the accompanying drawings.

BRIEF DESCRIPTION OF THE DRAWINGS

FIG. 7 is a side elevational view showing the manner in which cutting edges of cutter blades move relatively to the grass that has been trampled on.

DETAILED DESCRIPTION OF THE PREFERRED EMBODIMENT

Figure 1:
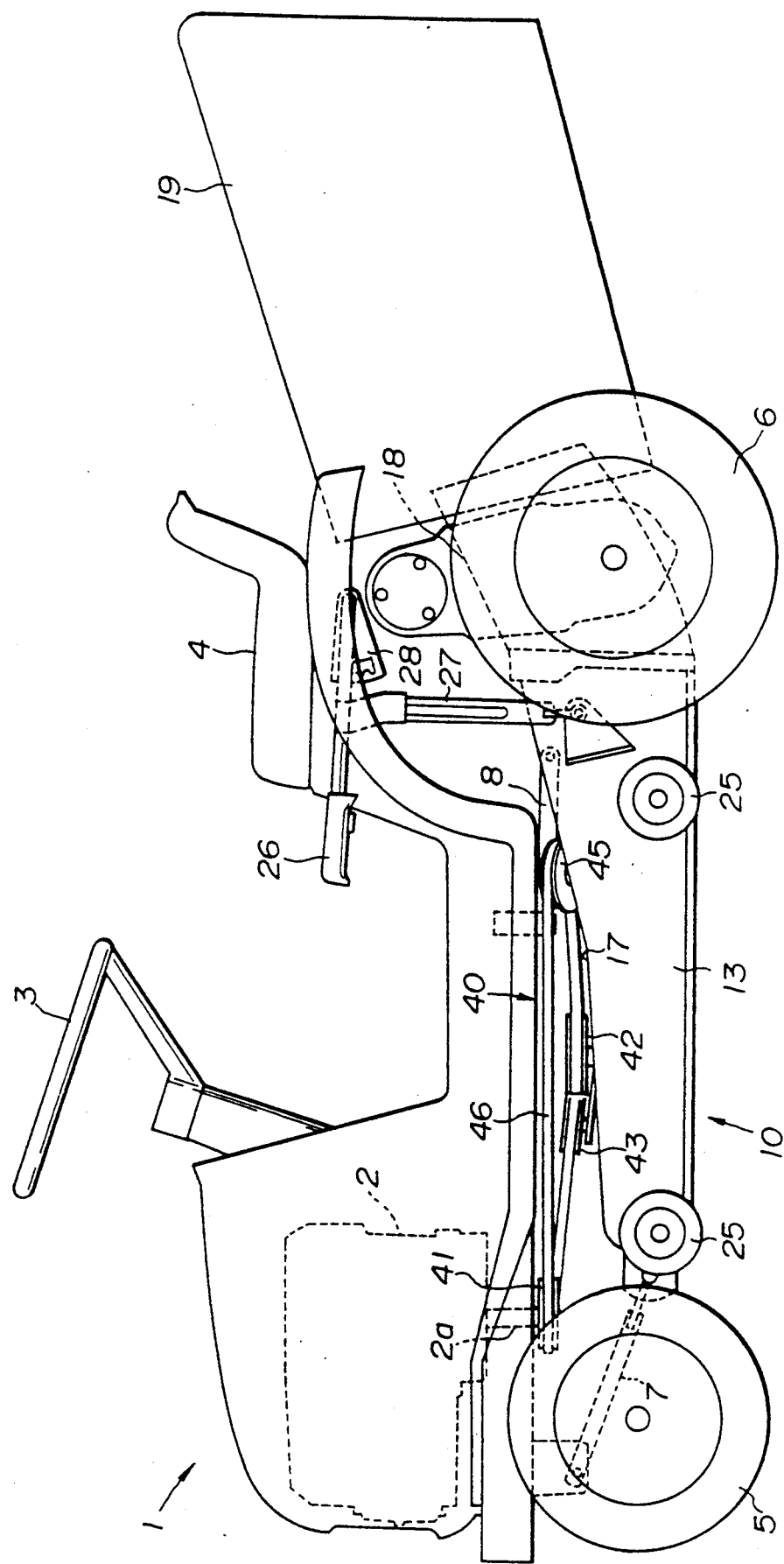
FIG. 1 is a side elevational view of a riding-type lawn mower having a rear discharge slot according to the present invention.

As shown in FIG. 1, a riding-type lawn mower, generally designated by the reference numeral 1, with a rear discharge slot according to the present invention comprises an engine 2 on a front portion of a lawn mower body or chassis, a steering wheel 3, a rider's seat 4, two front wheels 5, two rear wheels 6, and a cutter housing 10 supported substantially centrally below the lawn mower body by front and rear parallel links 7, 8.

Figure 2:
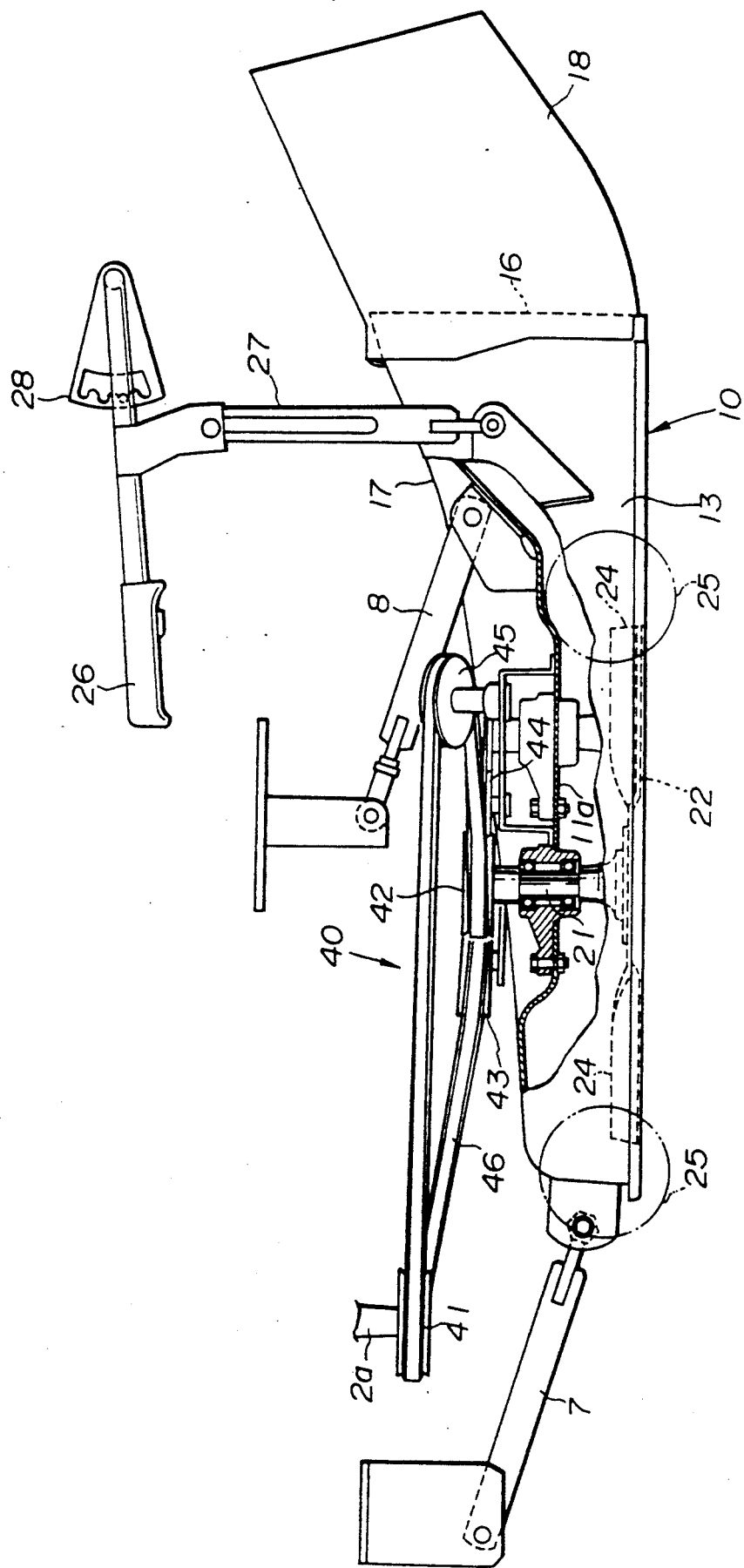
FIG. 2 is an enlarged side elevational view of a cutter housing and a belt-and-pulley mechanism of the riding-type lawn mower shown in FIG. 1.
Figure 3:
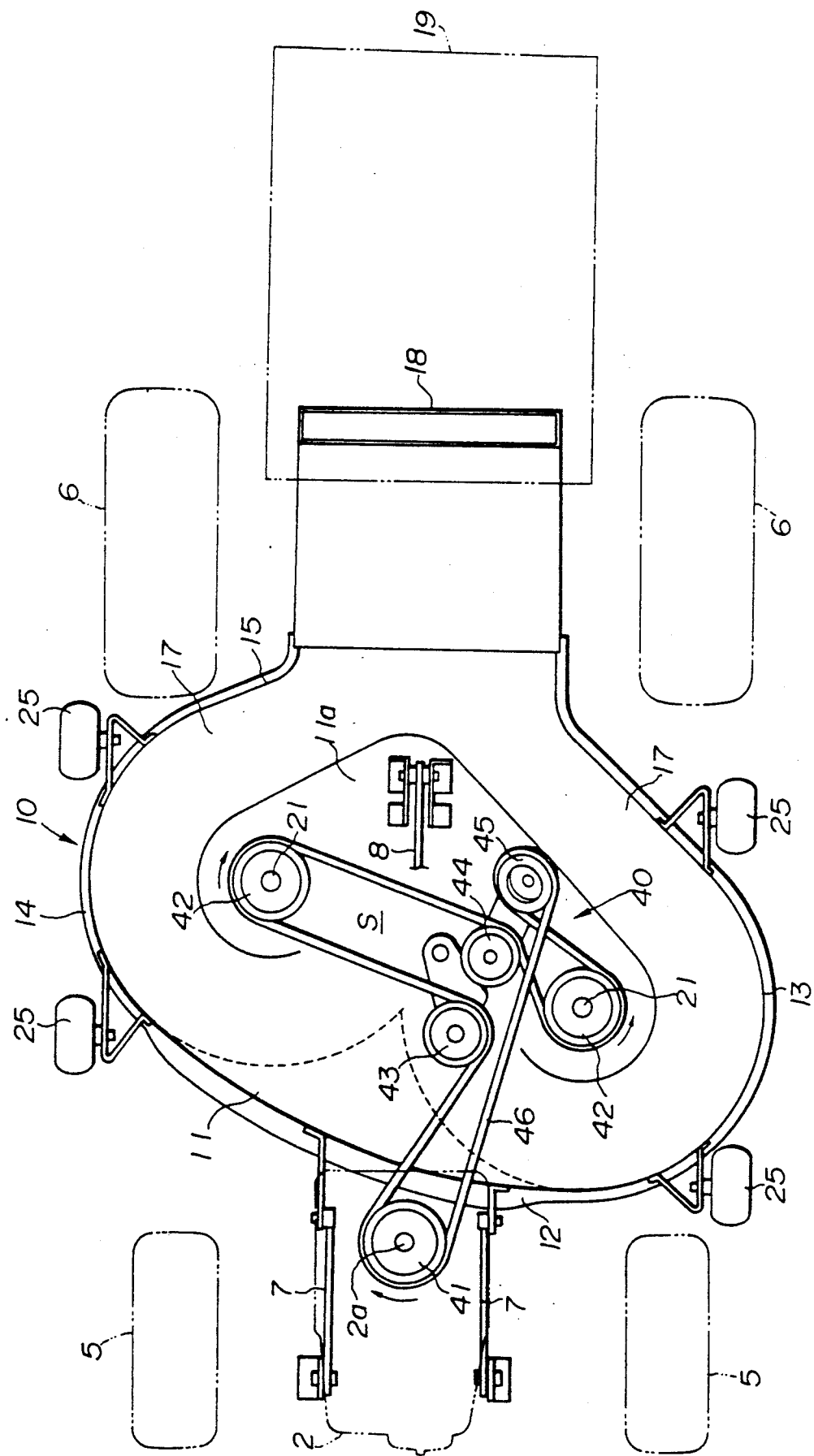
FIG. 3 is a plan view of the cutter housing and the belt-and-pulley mechanism shown in FIG. 2.
Figure 4:
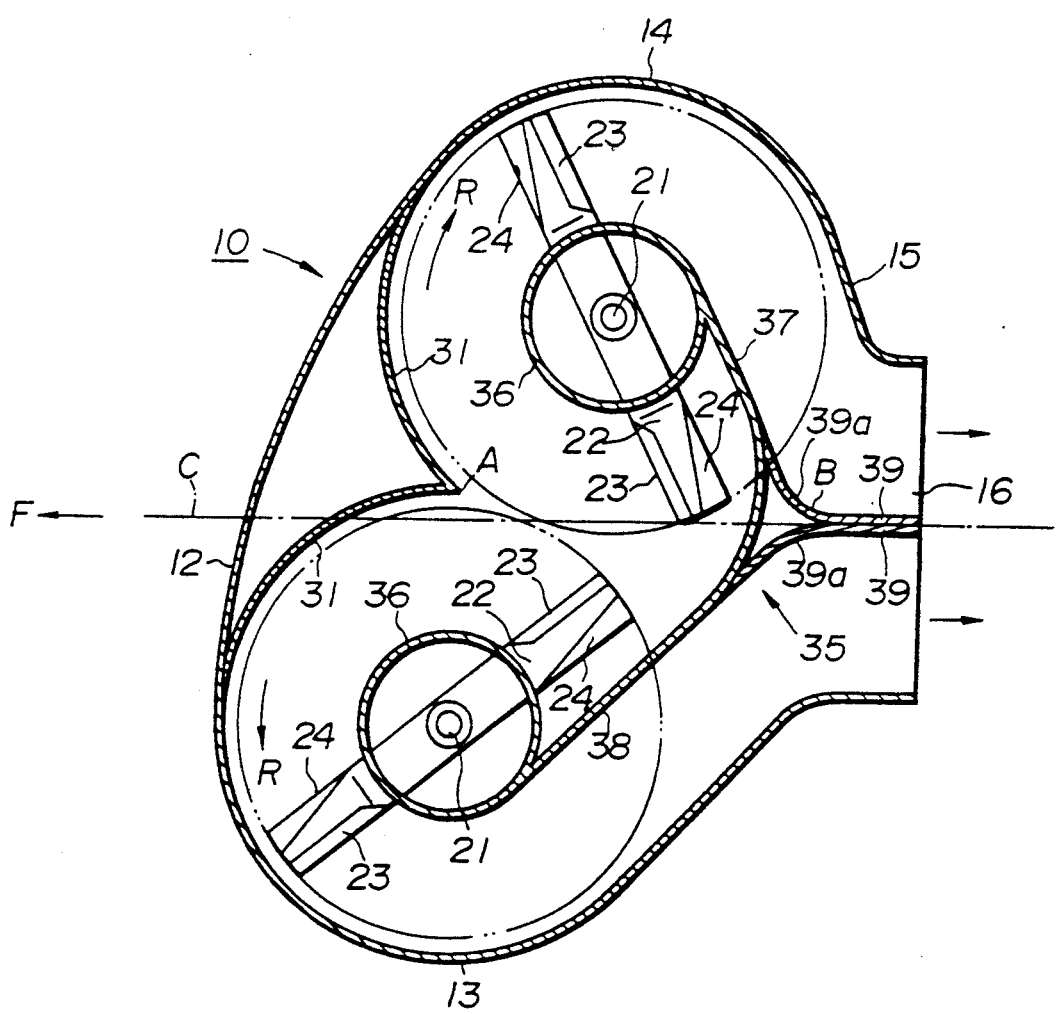
FIG. 4 is a horizontal cross-sectional view of the cutter housing.
Figure 5:
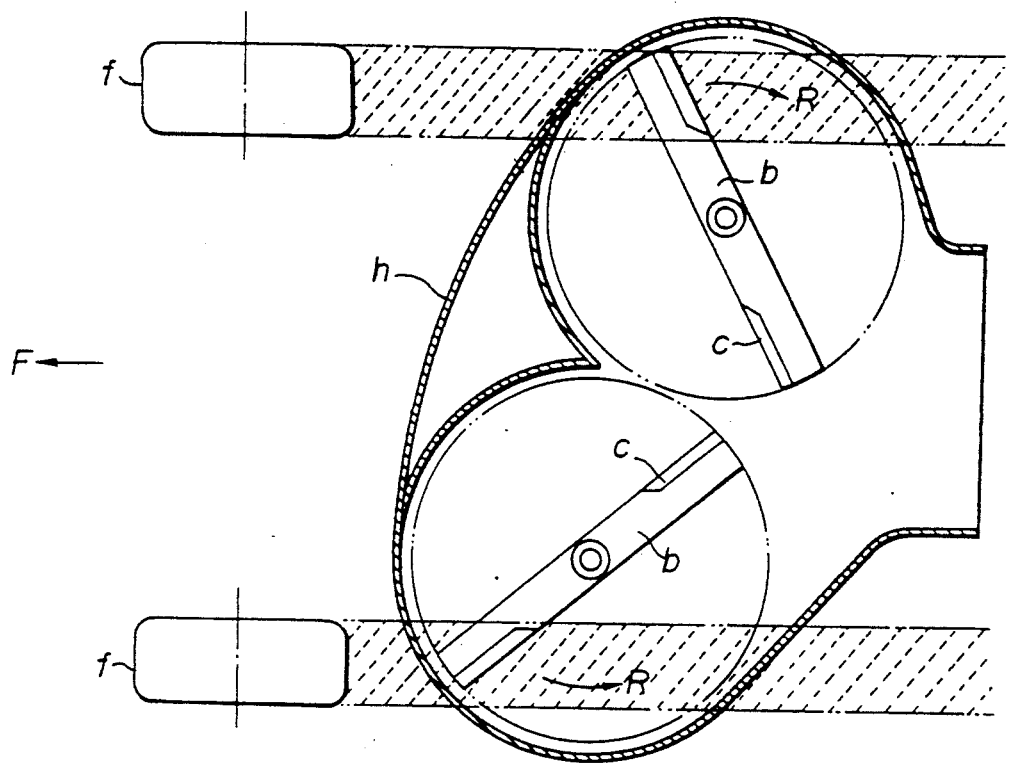
FIG. 5 is a horizontal cross-sectional view illustrative of paths of front wheels and cutter blades as they rotate.
Figure 6:
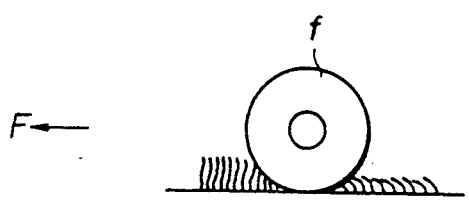
FIG. 6 is a side elevational view showing the manner in which grass is trampled on by the front wheels.
Figure 7:
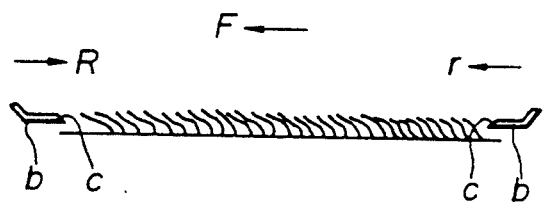

As also shown in FIGS. 2 through 4, the cutter housing 10 comprises an upper wall 11, a front wall 12 extending downwardly from the upper wall 11, two laterally spaced side walls 13, 14 extending downwardly from the upper wall 11, and a rear wall 15 extending downwardly from the upper wall 11. The cutter housing 10 has an open lower side. The rear wall 15 has a rearwardly projecting portion defining a rear discharge slot 16 therein, the rear discharge slot 16 being positioned substantially centrally between the rear wheels 6. To the rear discharge slot 16, there is connected a chute 18 (see FIG. 2) coupled to a grass bag 19 disposed behind the chute 18.

Two laterally spaced rotatable shafts 21 extend vertically through and are rotatably supported by the upper wall 11. The rotatable shafts 21 are operatively coupled to an output shaft 2a downwardly projecting from the engine 2 through a belt-and-pulley mechanism 40 (described later on).

The rotatable shafts 21 have lower ends connected respectively to cutter blades 22 at their center. As shown in FIG. 4, each of the cutter blades 22 has a cutting edge 23 and an upwardly raised portion 24 on each end portion. The cutter blades 22 are rotatable in a substantially horizontal plane.

The two cutter blades 22 are relatively positioned such that their circular paths are located closely to each other and positionally displaced from each other one behind the other along a center line C (see FIG. 4) of the cutter housing 10, while overlapping the center line C, the center line C being substantially aligned with the longitudinal axis of the lawn mower 1. Therefore, the cutter blades 22 as they rotate can cut grass without leaving any grass uncut therebetween.

Each of the side walls 13, 14 of the cutter housing 10 has a pair of front and rear anti-scalp rollers 25 (see FIGS. 1, 2, and 3).

The cutter housing 10 can be vertically adjusted in position by a height adjusting lever 26 (see FIGS. 1 and 2) disposed laterally of the rider's seat 4, through a link 27 operatively coupled to the lever 26 and the cutter housing 10. The height adjusting lever 26 can be held in a selected one of angular positions by a lever locking plate 28 (see FIG. 2).

As shown in FIG. 4, the cutter blade 22 positioned on the righthand side as viewed in the forward direction F is rotatable clockwise as viewed in plan, and the cutter blade 22 positioned on the lefthand side as viewed in the forward direction F is rotatable counterclockwise as viewed in plan, as indicated by the arrows R.

The rotatable shafts 21 of the cutter blades 22 are positioned inwardly of the paths of the front wheels 5 as shown in FIG. 3.

Therefore, any grass which has been trampled on forwardly by the front wheels 5 in the paths thereof can be raised by air streams developed by the raised portions 24 of the cutter blades 22 as they move over the paths of the front wheels 5, and the raised grass can reliably be clipped by the cutting edges 23 in the paths of the front wheels 5.

In the cutter housing 10, there is created a substantially triangular space (see FIGS. 3 and 4) between the front wall 12 and the paths of the cutter blades 22. The substantially triangular space is isolated from the cutter blades 22 located therebehind, by two scroll-shaped separators 31 that extend downwardly from the upper wall 11 immediately outside of the paths of the cutter blades 22. The separators 31 are joined to each other at a sharp joint A and connected to the front wall 12 of the cutter housing 10. The sharp joint A is disposed between the cutter blades 22 in a region where the cutter blades 22 start to move away from each other as indicated by the arrow R. Therefore, the sharp joint A and the separators 31 joined thereto serve to divide air streams laterally away from each other that have been developed by the cutter blades 22 as they rotate in the opposite directions.

The upper wall 11 of the cutter housing 10 has two laterally spaced curved portions 17 (see FIGS. 1 and 3) that are raised upwardly so that they are progressively higher from the front wall 11 toward the rear discharge slot 16. The raised portions 17 are joined to each other and highest over the rear discharge slot 16. The upper wall 11 also includes a lower flat portion 11a surrounded by the raised portions 17.

The raised portions 17 provide, within the cutter housing 10, respective discharge passages whose upper surfaces are progressively higher and whose cross-sectional areas are progressively larger from the side walls 13, 14 toward the rear discharge slot 16 along the directions indicated by the arrows R. Accordingly, grass clippings that have been cut by the cutter blades 22 can be discharged efficiently through the discharge passages and the rear discharge slot 16, and collected efficiently in the grass bag 19 through the chute 18.

The cutter housing 10 also has a scroll-shaped discharge guide 35 extending from around the rotatable shafts 21 to a central region of the rear discharge slot 16. The discharge guide 35 extends downwardly from the upper wall 11. The discharge guide 35 includes two laterally spaced cylindrical portions 36 disposed above the cutter blades 22, respectively, around the respective rotatable shafts 21 inwardly of the paths of the cutting edges 23, two laterally spaced substantially straight portions 37, 38 of different lengths extending rearwardly from rear outer surfaces of the cylindrical portions 36 and joined to each other across the center line C, the straight portions 37, 38 having respective imaginary extensions intersecting at a point B on the center line C, and two laterally spaced partitions 39 extending rearwardly from the respective straight portions 37, 38 into the central region of the rear discharge slot 16, the partitions 39 being joined to each other and dividing the rear discharge slot 16 into two laterally spaced sections behind the intersecting point B. The partitions 39 have respective front curved portions 39a that smoothly blend into the rear sections of the straight portions 37, 38.

In the illustrated embodiment, the cutter blades 22 are positionally displaced one behind the other along the center line C of the cutter housing 10, and the paths of the cutter blades 22 overlap the center line C, so that no grass will be left uncut between the cutter blades 22. With this layout of the cutter blades 22, the lengths of the straight portions 37, 38 of the scroll-shaped discharge guide 35 along the center line C up to the rear discharge slot 16 differ from each other, i.e., the straight portion 37 is shorter than the straight portion 38, making the flow of grass clippings along the shorter straight portion 37 stronger than the flow of grass clippings along the longer straight portion 38. If the partitions 39 were dispensed with, the grass clippings discharged along the longer straight portion 38 would be adversely affected by the grass clippings discharged along the shorter straight portion 37. Since the partitions 39 are disposed centrally in the rear discharge slot 16, the grass clippings discharged along the shorter and longer straight portions 37, 38 can equally be discharged well out of the rear discharge slot 16.

As described above, the partitions 39 are positioned behind the point B of intersection between the imaginary extensions of the straight portions 37, 38, and the partitions 39 are joined to the rear ends of the straight portions 37, 38 by the respective curved portions 39a thereof. Therefore, grass clippings discharged along the straight portions 37, 38 are smoothly guided toward the outer surfaces of the partitions 39 along the curved portions 39a, without causing a jam in the rear discharge slot 16.

Consequently, grass clippings that have been cut by the cutter blades 22 are guided through the discharge passages by the discharge guide 35 without mutual interference, and are ejected from the rear discharge slot 16 through the chute 18 into the grass bag 19.

In the illustrated embodiment, the grass bag 19 is positioned behind the body of the lawn mower 1 for collecting grass clippings discharged from the rear discharge slot 16. However, the grass bag 19 may be removed, and glass clippings may directly be discharged out from the rear discharge slot 6.

As shown in FIG. 3, the belt-and-pulley mechanism 40 comprises a drive pulley 41 mounted on the lower end of the output shaft 2a that projects downwardly from the engine 2 below the front portion of the lawn mower body, a pair of driven pulleys 42 mounted on the upper ends, respectively, of the rotatable shafts 21 that project upwardly from the lower flat portion 11a of the upper wall 11 surrounded by the raised portions 17, a pair of tension pulleys 43, 44 idly rotatably mounted on the upper wall 11 and positioned between the driven pulleys 42, an idler pulley 45 idly rotatably mounted on the upper wall 11 behind the tension pulleys 43, 44 and having an inclined axis, and an endless V belt 46 trained around the pulleys 41, 42, 43, 44, 45. Therefore, rotative power from the engine 2 can be transmitted to the rotatable shafts 21 by the pulleys 41, 42, 43, 44, 45 and the V belt 46.

The belt-and-pulley mechanism 40 is disposed in a space S (see FIG. 3) that is defined over the low flat portion 11a between the raised portions 17 of the upper wall 11 of the cutter housing 10. Accordingly, even though the upper wall 11 includes the raised portions 17 that define the discharge passages therebelow, the overall height of the lawn mower 2 is not increased by the belt-and-pulley mechanism 40 that is required to transmit the engine power to the cutter blades 22. As a result, the lawn mower 2 according to the present invention may be relatively small in size.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

We claim:

1. A riding-type lawn mower comprising:
a body;
an engine mounted on said body;
front and rear wheels rotatably supported on said body;
a cutter housing disposed substantially centrally below said body, said cutter housing having an upper wall facing said body and a rear wall extending from said upper wall, said rear wall having a rear discharge slot defined therein;
a pair of cutter blades laterally spaced from each other and rotatably housed in said cutter housing for rotation in a substantially horizontal plane;
a pair of rotatable shafts extending through and rotatably supported by said upper wall, said cutter blades being mounted on lower ends of said rotatable shafts, respectively;
said cutter blades being arranged such that the cutter blade on the righthand side as viewed in a forward direction of said body is rotatable clockwise as viewed in plan and the cutter blade on the lefthand side as viewed in the forward direction of said body is rotatable counter-clockwise as viewed in plan;
said upper wall having a pair of laterally spaced portions raised upwardly and defining respective discharge passages in said cutter housing and a substantially flat portion disposed between lower ends of the laterally spaced raised portions; and
a belt-and-pulley mechanism disposed between the raised portions of said upper wall and supported on said substantially flat portion of said upper wall, for transmitting rotative power from said engine to said rotatable shafts.

2. A riding-type lawn mower according to claim 1, wherein said belt-and-pulley mechanism comprises a pair of driven pulleys, a tension pulley and an idler pulley, the tension and idler pulleys are mounted to the flat portion of said upper wall.

3. A riding-type lawn mower according to claim 1, wherein said cutter blades are positionally displaced from each other along a longitudinal axis of the lawn mower.

4. A riding-type lawn mower according to claim 1, including means for smoothly and independently discharging grass clippings from each of said cutter blades into said rear discharge slot in a direction substantially parallel to a longitudinal axis of the lawn mower.

5. A riding-type lawn mower according to claim 4, wherein said discharge means discharges lawn clippings from the cutter blades, respectively, into respective halves of said discharge slot defined on opposite sides of the longitudinal axis of the lawn mower.

6. A riding-type lawn mower according to claim 4, wherein said discharging means discharges said grass clippings from said cutting blades, respectively, into said rear discharge slot at different flow strengths and without interfering with grass clippings from the other cutting blade.

7. A riding-type lawn mower according to claim 1, including means for discharging grass clippings from said cutting blades, respectively, into said rear discharge slot at different flow strengths and without interfering with grass clippings from the other cutting blade.

8. A riding-type lawn mower according to claim 1, wherein said rear discharge slot is defined in a laterally central portion of said rear wall.

9. A riding-type lawn mower comprising:
a body;
a cutter housing disposed below said body, said cutter housing having an upper wall facing said body and a rear wall extending from said upper wall, said rear wall having a rear discharge slot defined therein;
a pair of cutter blades laterally spaced from each other and rotatably housed in said cutter housing for rotation in a substantially horizontal plane;
a pair of rotatable shafts extending through and rotatably supported by said upper wall, said cutter blades being mounted on lower ends of said rotatable shafts, respectively;
said cutter blades being arranged such that the cutter blade on the righthand side as viewed in a forward direction of said body is rotatable clockwise as viewed in plan and the cutter blade on the lefthand side as viewed in the forward direction of said body is rotatable counterclockwise as viewed in plan; and
a scroll-shaped discharge guide extending from said upper wall, said scroll-shaped discharge guide comprising a pair of laterally spaced substantially cylindrical portions disposed around said rotatable shafts, respectively, a pair of partitions joined to each other and disposed substantially centrally in said rear discharge slot, and a pair of laterally spaced substantially straight portions extending between and joined to outer surfaces of said cylindrical portions and said partitions.

10. A riding-type lawn mower according to claim 9, wherein said cutter housing has a center line substantially aligned with a longitudinal axis of said body, said cutter blades being positionally displaced from each other along said center line and rotatable along respective paths that overlap said center line, said straight portions having different lengths and having imaginary extensions intersecting at a point on said center line, said partitions being positioned behind said point and said partitions having respective front curved portions blending into rear sections, respectively, of said straight portions.

11. A riding-type lawn mower comprising:
a body;
a cutter housing disposed below said body, said cutter housing having an upper wall facing said body and a rear wall extending from said upper wall, said rear wall having a rear discharge slot defined therein;
a pair of cutter blades laterally spaced from each other and rotatably housed in said cutter housing for rotation in a substantially horizontal plane;
a pair of rotatable shafts extending through and rotatably supported by said upper wall, said cutter blades being mounted on lower ends of said rotatable shafts, respectively;
said cutter blades being arranged such that the cutter blade on the righthand side as viewed in a forward direction of said body is rotatable clockwise as viewed in plan and the cutter blade on the lefthand side as viewed in the forward direction of said body is rotatable counter-clockwise as viewed in plan; and
means for independently discharging grass clippings from the cutter blades, respectively, into said rear discharge slot in a direction substantially parallel to the longitudinal axis of the lawn mower.

12. A riding-type lawn mower according to claim 11, wherein said discharge means discharges the grass clippings from the cutter blades, respectively, into said rear discharge slot at different flow strengths and without interfering with the grass clippings from the other cutting blade.

13. A riding-type lawn mower according to claim 12, wherein said cutter blades are positionally displaced from each other along said longitudinal axis of the lawn mower.

14. A riding-type lawn mower according to claim 11, wherein said discharge means discharges said grass clippings from the cutter blades, respectively into respective halves of said discharge slot, said respective halves of the discharge slot being defined on opposite sides of a longitudinal axis of the lawn mower.

* * * * *

UNITED STATES PATENT AND TRADEMARK OFFICE
CERTIFICATE OF CORRECTION

PATENT NO. : 5,214,906
DATED : June 1, 1993
INVENTOR(S) : Mitsuo Saki et al.

It is certified that error appears in the above-indentified patent and that said Letters Patent is hereby corrected as shown below:

Column 4, line 62, change "FIG. 4," to --FIGS. 2 and 4,--.

Column 8, line 60 (claim 9, line 25), delete the period after "cylindrical".

Signed and Sealed this

Eighth Day of February, 1994

Attest:

BRUCE LEHMAN

*Attesting Officer*  *Commissioner of Patents and Trademarks*